(12) United States Patent
Scott

(10) Patent No.: US 12,276,361 B2
(45) Date of Patent: Apr. 15, 2025

(54) SINGLE-USE SANITARY TRI-CLAMP

(71) Applicant: Daniel Scott, Liverpool (GB)

(72) Inventor: Daniel Scott, Liverpool (GB)

( * ) Notice: Subject to any disclaimer, the term of this patent is extended or adjusted under 35 U.S.C. 154(b) by 0 days.

(21) Appl. No.: 18/248,303

(22) PCT Filed: Oct. 7, 2021

(86) PCT No.: PCT/GB2021/052586
§ 371 (c)(1),
(2) Date: Apr. 7, 2023

(87) PCT Pub. No.: WO2022/074390
PCT Pub. Date: Apr. 14, 2022

(65) Prior Publication Data
US 2023/0366493 A1    Nov. 16, 2023

(30) Foreign Application Priority Data
Oct. 9, 2020   (GB) ...................................... 2016085

(51) Int. Cl.
*F16L 23/06*   (2006.01)
(52) U.S. Cl.
CPC ................... *F16L 23/06* (2013.01)
(58) Field of Classification Search
CPC ............ F16L 23/06; F16L 23/04; F16L 33/12
See application file for complete search history.

(56) References Cited

U.S. PATENT DOCUMENTS

| 196,807 | A | * | 11/1877 | Jolliffe et al. | .......... F16L 23/06 24/270 |
| 1,162,362 | A | * | 11/1915 | Hyland | .................... F16L 23/06 285/409 |
| 3,828,403 | A | | 8/1974 | Perrin et al. | |

(Continued)

FOREIGN PATENT DOCUMENTS

| DE | 2060588 A1 | * | 8/1971 |
| DE | 2310680 B1 | * | 8/1974 |

(Continued)

OTHER PUBLICATIONS

International Search Report issued on Jan. 21, 2022, in corresponding International Patent Application No. PCT/GB2021/052586; 6 pages.

*Primary Examiner* — Zachary T Dragicevich
*Assistant Examiner* — James A Linford
(74) *Attorney, Agent, or Firm* — Maier & Maier, PLLC

(57) ABSTRACT

A clamp having a first arcuate clamp member pivotally connected to a second arcuate clamp member via a first pivot member 16 located at one end of the clamp members, the clamp members being pivotable between an open configuration in which the free ends of the clamp members are displaced from one another facilitating the insertion of the mating pipe flanges to be clamped, and a closed configuration wherein the free ends of the clamp members contact one another and encircle the mating flanged end connections. Associated with the first arcuate clamp member is an arcuate articulated lever which itself is pivotally attached by a third pivot member linking to member, which is itself pivotally attached by second pivot member to the free end of the first clamp member.

11 Claims, 6 Drawing Sheets

(56) References Cited

U.S. PATENT DOCUMENTS

| | | | | |
|---|---|---|---|---|
| 5,380,052 A | * | 1/1995 | Hendrickson | F16L 23/06 |
| | | | | 285/364 |
| 9,512,944 B1 | * | 12/2016 | Buzdum | F16L 23/06 |
| 2007/0138351 A1 | * | 6/2007 | Wu | F16L 23/06 |
| | | | | 248/74.2 |
| 2010/0327576 A1 | * | 12/2010 | Linhorst | F16L 23/06 |
| | | | | 285/38 |

FOREIGN PATENT DOCUMENTS

| | | | | |
|---|---|---|---|---|
| DE | 2523338 B1 | * | 9/1976 | |
| DE | 2810589 A1 | * | 9/1979 | |
| DE | 3721063 C1 | * | 5/1988 | |
| DE | 3936102 C1 | * | 1/1991 | |
| DE | 8033016 U1 | | 5/1994 | |

\* cited by examiner

SINGLE-USE SANITARY TRI-CLAMP

FIELD

The present invention relates to clamps. More particularly, the present invention relates to clamps used for coupling two pipes fitted with mating flanges together.

BACKGROUND

In the pharmaceutical and Sanitary Process industries, it is known to clamp pipes (identified as flexible or Rigid tubing-fitted with mating clamp flanges) together in a manner which creates a hygienic seal between the assembled components.

Existing clamps have a pair of hinged jaws which are locked together using a threaded bolt which is fastened together with a winged locking nut and also uses a pivoting pin which is received by the screw thread at the open ends of the jaws.

A problem associated with current clamp arrangement is that over-tightening of the winged nut to create a clamping force can occur whereby the integrity of the components being clamped together can be impaired, resulting in possible pressure failure of the mating sanitary gasket and contamination of the fluids being passed through the pipes or else to the surrounding environment, often both.

It would be advantageous to address one or more of the problems associated with the prior art.

SUMMARY

In accordance with a first aspect of the present invention, there is provided a clamp for connecting two mating flanges, The said clamp comprising of first and second jaw members with the first jaw member being pivotally mounted to the second jaw and having at its free end an articulated lever with a latch, the latch engageable with a catch disposed at the free end of the second jaw member, Wherein the clamp has an open configuration in which the free ends of the jaw members are displaced apart and a locked configuration in which the free end of the jaw halves are brought together to join one another, and the latch is disposed and engaged in the catch, and said lever being left in its closed configuration.

The mating flanges/pipes to be clamped—may be attached to flexible or rigid tubing and having a circular cross section.

The clamp of the present invention may encircle 360 degrees of the pipe flange sections to be joined and are intended to join, secure and/or seal the sections of pipe.

The clamp may have a predefined internal diameter and therefore designed to join, secure and/or seal pipes of a correspondingly sized diameter.

The clamp jaw members may comprise a channel for receiving dimensionally sized mating clamp flanges-disposed at the ends of the two pipes to be coupled. The channel may be complementarily shaped to the mating flanges when they are assembled together.

The present invention may connect two mating clamp flanges together using a flexible hygienic seal.

The present invention may be suitable for cleansing by way of autoclaving or gamma irradiation.

The present invention may be manufactured from any suitable non-metallic material, including for example, Nylon, Polypropylene, Polysulfone or PVDF polymer based materials.

The present invention provides a much simpler clamp design which does not employ a method of operation which includes a threaded shaft and mating locknut—which clamps of such design can be damaged easily by over-tightening by the user—which can cause protrusion of the mating rubber hygienic seal, for example, protrusion into the sterile flow-paths if over-tightened—causing potential flow restrictions and cross contamination of any liquid medias being transferred through the pipes.

The clamp of the present invention may have an over-centre self-locking operation which by design joins the two separate halves of the clamp together by pushing the moving half of the clamp towards the fixed half of the clamp.

The clamp of the present invention eliminates the possibility of being over-tightened by the user, thus prolonging the working life of the clamp and avoiding the possibility of damaging the pipes with mating flanges to be clamped.

In an embodiment, once the present clamp is in its closed configuration, it enjoys a preference to stay in the closed position.

In an embodiment, the present clamp comprises a design which locks the clamp in the closed configuration by preventing the lever from being accidentally displaced away from its locked position. The clamp may further comprise an optional sacrificial security seal (such as a safety Locking Pin device) which can provide evidence of any tampering with the clamp Assembly.

The clamp of the present invention may have a lower profile for protruding parts—other than known clamps for a given pipe diameter, minimising the risk of product integrity, reducing transportation costs, and also reducing footprint in situ.

The clamp of the present invention may possess a pre-set over-centre locking force.

In accordance with a further aspect of the present invention, there is provided a kit of parts comprising two or more mating pipe/flanged components and at least one clamp and a mating flexible seal as described herein above.

BRIEF DESCRIPTION OF THE DRAWINGS

The present invention will now be described by way of example only with reference to the accompanying images in which.

DETAILED DESCRIPTION

Figure 1:
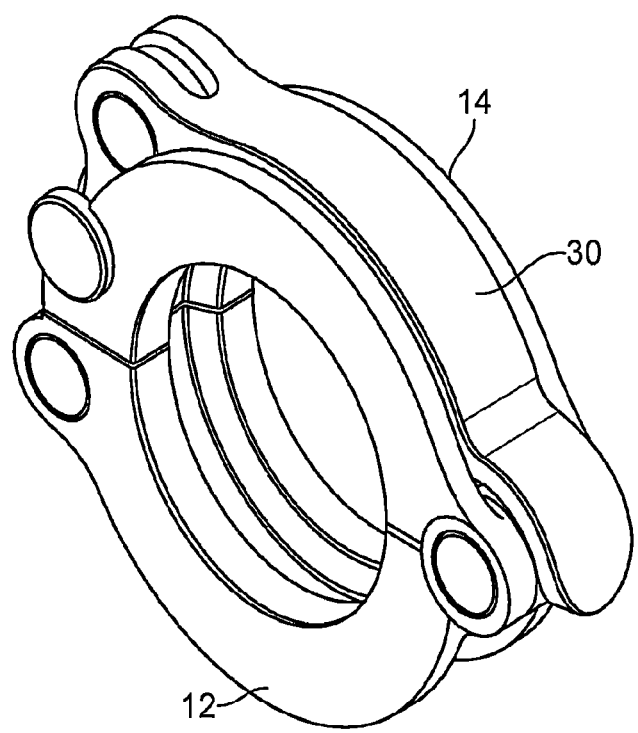
FIG. 1 shows a clamp in accordance with the present invention in a closed and locked configuration.

There is provided a clamp 10 having a first arcuate clamp member 12 pivotally connected to a second arcuate clamp member 14 via a first pivot member 16 located at one end of the clamp members, the clamp members being pivotable between an open configuration in which the free ends 18 & 20 of the clamp members are displaced from one another facilitating the insertion of the mating pipe flanges to be clamped, and a closed configuration wherein the free ends 18 & 20 of the clamp members contact one another and encircle the mating flanged end connections.

Associated with the first arcuate clamp member is an arcuate articulated lever 30 which itself is pivotally attached by a third pivot member 32 linking to member 34, which is itself pivotally attached by second pivot member 36 to the free end of the first clamp member 12.

The lever 30 has a recess (40) which accommodates the security pin 150 (in FIG. 4) disposed proximally to the third pivot member 32 and comprising two cylindrical members 42 & 44 extending perpendicularly to the longitudinal plane of the lever and shaped to be received by a catch comprising complementarily shaped arcuate catches 50 & 52 disposed at the free end of the second clamp member.

Each clamp member has a elongated channel 60 & 62 extending the entire length of the inner surface of each member. The channels 60 & 62, each have a base 64 and two inclined side walls 66 & 68 extending therefrom and sized to accommodate the mating flanges attached at the end of the pipes to be coupled together using the clamp.

Pivot 16 comprises a flat headed Rivet 80 comprising a circular flat head 82 from which a shaft 84 extends perpendicularly to the plane of the flat head 82. The rivet 80 is received in a complementarily shaped sleeve 86, having a cylindrical body 88 open at one end and sized to receive the rivet shaft 84 of rivet 80. The other end of the sleeve 86 is closed and has a circular flat head 90. The shaft and sleeve body co-operate with apertures located at the ends of the first and second clamp members and extend therethrough to connect the arcuate clamp members and provide a pivot point. The apertures are located in lugs 100 & 102 of the second clamp member and lug 104 of the first clamp member. Lugs 100 and 102 are separated and form a space therebetween to receive the lug 104. When the apertures are aligned, the rivet pin and sleeve may be inserted therethrough and secured to form the pivot.

Figure 2:
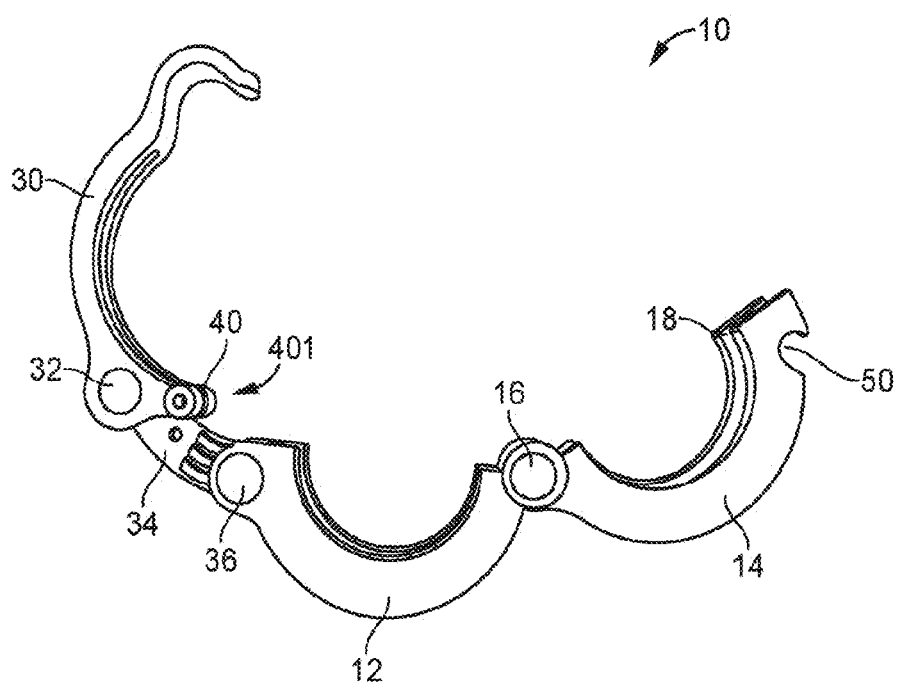
FIG. 2 and FIG. 3 shows the clamp of FIG. 1 in an open configuration.
Figure 3:
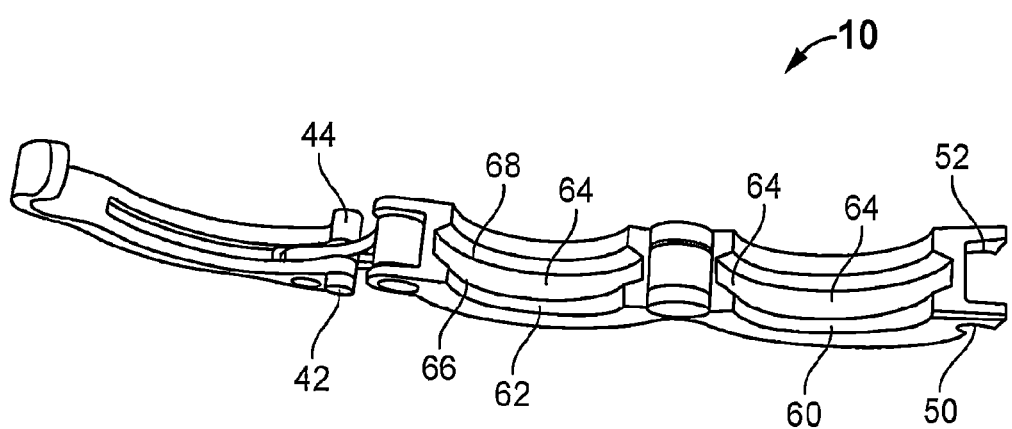
Figure 4:
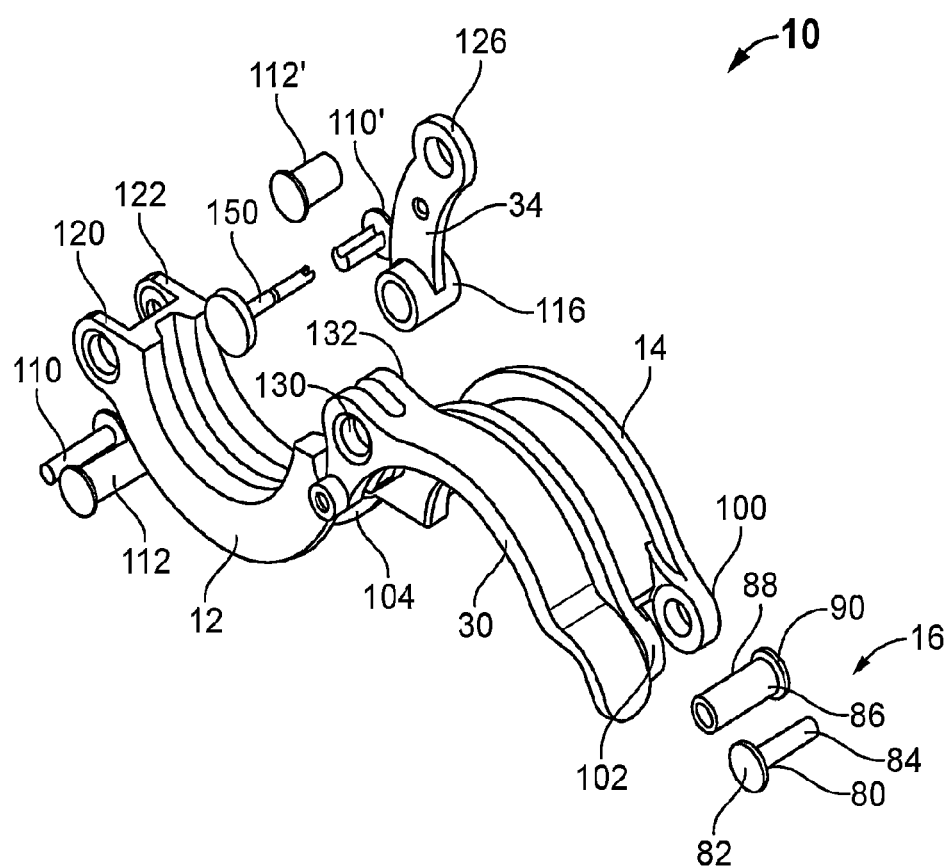
FIG. 4 shows an exploded view of a clamp in accordance with the present invention.
Figure 5:
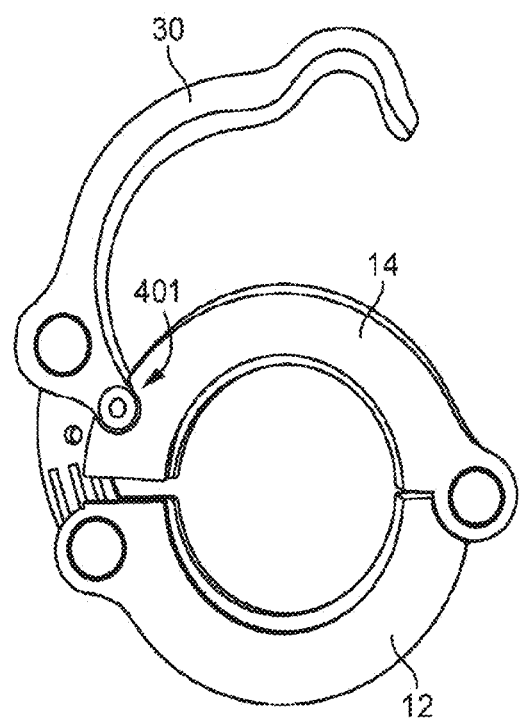
FIG. 5 shows the clamp of FIGS. 1 to 4 where the latch 401 is engaged with a catch and the clamp is in an intermediate configuration between the open and closed configurations.
Figure 6:
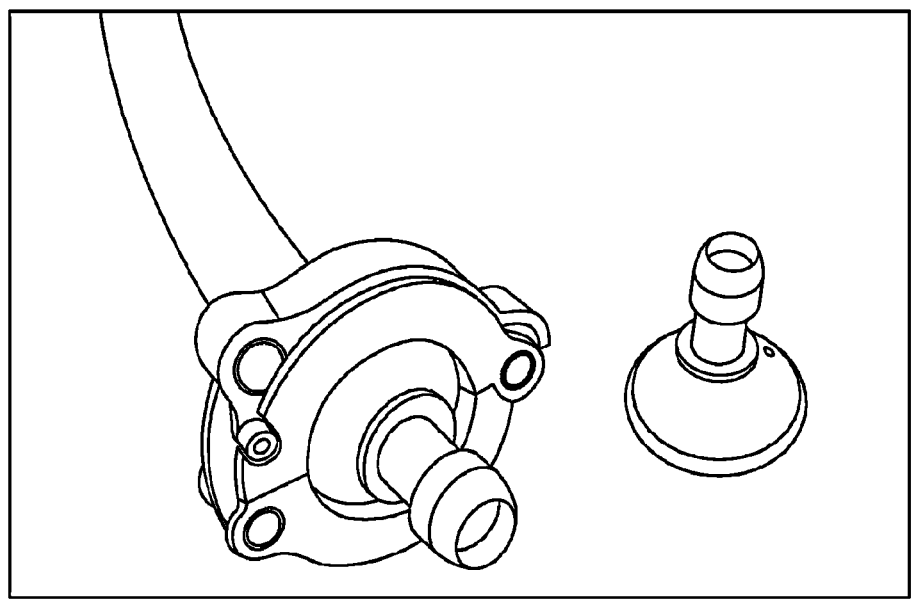
FIG. 6 shows how a mating flange/hose barb connector is fully clamped in accordance with the present invention.

Similarly, pivots 32 and 36 (in FIG. 2) also comprises a rivet pin and sleeve arrangement. The second pivot 36 and the third pivot 32 each comprise a rivet pin 110 & 110' and a sleeves 112 & 112' as shown in FIG. 4

Rivet pin 110 and sleeve 112 connect one end of the lever 116 (of part 34) to the linking member to the first arcuate member which has a pair of spaced-apart lugs 120 & 122 to receive the one end of the linking member rivet pin 110 and sleeve 112 therethrough, whilst the other end of the linking member 126 is received in a pair of lugs 130 & 132 disposed on the end of lever 30 and secured thereto via the rivet pin 110 and sleeve 112' passing through complementarily shaped apertures.

Extending through the latch is an aperture which can be aligned with a complementarily shaped aperture located in the linking member when in the closed configuration. A sacrificial locking pin 150 may be inserted therethrough to secure the clamp in a closed configuration to prevent the clamp from being opened accidentally or from being tampered with.

When the clamp is to be closed, the lever and first clamp member are displaced such that the latch is received by the catch. Once engaged, the lever is displaced in a direction toward the first pivot member drawing the clamp members together such that-they join and encircle the mating pipe ends to be clamped. The lever is displaced to the locked position when it overlies the first arcuate clamp member.

The invention claimed is:

1. A clamp for coupling two mating flanges, the clamp comprising first and second jaw members, the first jaw member being pivotally mounted by a pivot member to the second jaw member and having at its free end an articulated lever having a proximal end with a latch, the proximal end located proximal to the free end of the first jaw member, the latch engageable with a catch disposed at the free end of the second jaw member,
   wherein the clamp has an open configuration in which the free ends of the jaw members are displaced apart and the two mating flanges may be received between the jaw members, and a closed configuration in which the free ends of the jaw members are proximal to one another, wherein said lever is moveable between an unlocked configuration wherein the latch is displaced away from the catch, and a locked configuration wherein the latch is received by and engages with the catch,
   wherein the lever has an arch-shaped distal end opposite the proximal end,
   wherein the arch-shaped distal end is on a farthest end of the lever further away from the free end of the first jaw member than the proximal end, and
   wherein the arch-shaped distal end of the lever overlaps the pivot member and the proximal end adjacent the arch-shaped distal end is at least partially embedded in the second jaw member when the lever is in the locked configuration by at least partially encircling the pivot member.

2. The clamp as claimed in claim 1, wherein the jaw members are arcuate in shape.

3. The clamp as claimed in claim 2, wherein the jaw members form a closed circular body when in the closed configuration.

4. The clamp as claimed in claim 1, having a predefined internal diameter to join, secure and/or seal the two mating flanges of a correspondingly sized diameter.

5. The clamp as claimed in claim 1, comprising a channel for receiving compatible flanges disposed at the ends of two pipes to be coupled.

6. The clamp as claimed in claim 1, comprising a 100% polymer-based material construction.

7. The clamp as claimed in claim 1, having an over-centre self-locking operation which joins the two jaw members of the clamp together.

8. The clamp as claimed in claim 1, comprising a safety feature to permanently lock the clamp in the closed configuration by preventing the lever from being displaced away from its locked configuration.

9. The clamp as claimed in claim 1, further comprising a sacrificial security seal which can prevent accidental opening of the clamp and/or also provide evidence of any tampering with the clamp or the mating sanitary seal.

10. The clamp as claimed in claim 1, having a pre-set over-centre locking force.

11. A kit of parts comprising of two or more pipe members and at least one clamp as claimed in claim 1.

* * * * *